United States Patent
Chen et al.

(10) Patent No.: US 8,307,673 B2
(45) Date of Patent: *Nov. 13, 2012

(54) GLASS LAMPSHADE AND METHOD FOR PRODUCING THE SAME

(75) Inventors: Haisheng Chen, Shenzhen (CN); Naiqun Jiang, Shenzhen (CN); Chunping Zhang, Shenzhen (CN); Hui Liao, Shenzhen (CN)

(73) Assignee: Shenzhen Tronsin Illuminating Technique Ltd., Shenzhen (CN)

( * ) Notice: Subject to any disclaimer, the term of this patent is extended or adjusted under 35 U.S.C. 154(b) by 631 days.

This patent is subject to a terminal disclaimer.

(21) Appl. No.: 12/484,270

(22) Filed: Jun. 15, 2009

(65) Prior Publication Data

US 2009/0310369 A1 Dec. 17, 2009

(30) Foreign Application Priority Data

Jun. 13, 2008 (CN) .......................... 2008 1 0067844

(51) Int. Cl.
  *C03B 23/20* (2006.01)
  *C03B 23/203* (2006.01)
(52) U.S. Cl. .................. 65/36; 65/33.5; 65/33.6; 65/42; 65/54; 362/351; 362/356

(58) Field of Classification Search ................ 65/23, 24, 65/33.5, 33.6, 36, 3, 42, 54, 488; 362/351, 362/356

See application file for complete search history.

(56) References Cited

U.S. PATENT DOCUMENTS

| | | | | |
|---|---|---|---|---|
| 3,455,667 A | * | 7/1969 | Snitzer et al. | 65/411 |
| 4,009,309 A | * | 2/1977 | Holt | 428/38 |
| 4,415,614 A | * | 11/1983 | von Loewis of Menar | 428/38 |
| 4,786,303 A | * | 11/1988 | Padalino | 65/439 |
| 6,257,022 B1 | * | 7/2001 | Caplan et al. | 65/107 |
| 2004/0214006 A1 | * | 10/2004 | Hirayama et al. | 428/416 |

FOREIGN PATENT DOCUMENTS

| DE | 10127090 A1 | * | 12/2002 |
| JP | 52069421 A | * | 6/1977 |
| WO | WO 2008095455 A1 | * | 8/2008 |

* cited by examiner

*Primary Examiner* — Matthew Daniels
*Assistant Examiner* — Lisa Herring
(74) *Attorney, Agent, or Firm* — Matthias Scholl P.C.; Matthias Scholl

(57) ABSTRACT

A glass lampshade comprising a fusion body of crystal grain glass, an upper crystal glass plate, a lower crystal glass plate, and a curing gel layer. The upper crystal glass plate is attached to the lower crystal plate via the curing gel layer. The fusion body of crystal grain glass is attached to the upper crystal glass plate. A method of producing the glass lampshade.

5 Claims, 2 Drawing Sheets

GLASS LAMPSHADE AND METHOD FOR PRODUCING THE SAME

CROSS-REFERENCE TO RELATED APPLICATIONS

Pursuant to 35 U.S.C. §119 and the Paris Convention Treaty, this application claims the benefit of Chinese Patent Application No. 200810067844.2 filed on Jun. 13, 2008, the contents of which are incorporated herein by reference.

BACKGROUND OF THE INVENTION

1. Field of the Invention

The invention relates to a lampshade and a method for producing the same, and particularly to a hot-melt glass lampshade and a method for producing the same.

2. Description of the Related Art

Glass lampshades are widely used in illuminating devices. However, there are several problems with conventional glass lampshades. Firstly, they feature simple technological designs and therefore achieve insufficient decorative effect; secondly, they have poor transparency and therefore feature poor illuminating effect; thirdly, they are usually unsafe since they easily break possibly causing injuries.

BRIEF SUMMARY OF THE INVENTION

In view of the above-described problems, it is one objective of the invention to provide a hot-melt glass lampshade that features good decoration and illuminating effects and is safe to use.

It is another objective of the invention to provide a method for producing a hot-melt glass lampshade that features good decoration and illuminating effect and is safe to use.

To achieve the above objectives, in accordance with one embodiment of the invention, provided is a hot-melt glass lampshade, comprising a fusion body made of crystal grain glass, an upper crystal glass plate, a lower crystal glass plate, and a UV radiation curing gel layer, wherein the upper crystal glass plate is attached to the lower crystal plate via the UV radiation curing gel layer, and the fusion body of crystal grain glass is attached to the upper crystal glass plate.

In a class of this embodiment, the fusion body of crystal grain glass comprises a plurality of crystal grains. The crystal grains are arranged vertically on the upper crystal glass plate. The contacting parts of adjacent crystal grains become attached to each other when hot melt is formed. The contacting parts of crystal grains and upper crystal glass plate are also attached to each other in a hot melt manner.

In a class of this embodiment, the crystal grains are between 3 and 5 mm in length, between 3 and 5 mm in width, and between 12 and 20 mm in height.

In a class of this embodiment, the fusion body of crystal grain glass is between 12 and 20 mm in thickness.

In a class of this embodiment, the crystal glass plates are transparent, semi-transparent, or tawny.

In accordance with another embodiment of the present invention, provided is a method for producing a hot melt glass lampshade, comprising:

a) cutting a crystal glass plate into crystal grains, and cleaning and drying the crystal grains;

b) putting a pair of crystal glass plates comprising an upper crystal glass plate and a lower crystal glass plate into a mold, filling powdery aluminum hydroxide with a thickness of between 1 and 2 mm as a mold release agent between the upper crystal glass plate and the lower crystal glass plate, and arranging the crystal grains vertically and orderly on the upper crystal glass plate, the crystal grains abutting against each other and completely filling the mold;

c) putting the mold into a hot melting furnace, raising the temperature of the furnace to between 700 and 730° C. over a period of between 3 and 4 hours and maintaining the temperature for 25-35 minutes so that the contacting parts of adjacent crystal grains are attached to each other and similarly, the contacting parts of the crystal grains and the upper crystal glass plate are attached to each other, and then, decreasing the temperature to room temperature over a period of between 24 and 48 hours to form a crystal grain hot-melt glass body; and d) optionally, taking out the glass body from the hot melting furnace, cleaning out the mold release agent, injecting curing gel between the crystal glass plates, and irradiating the crystal glass plate by sunlight or ultraviolet light.

In a class of this embodiment, the crystal grains are between 3 and 5 mm in length, 3-5 mm in width, and 12-20 mm in height.

In a class of this embodiment, the crystal grains have same height and different cross section.

In a class of this embodiment, the pair of crystal glass plates is between 4 and 6 mm in thickness.

In a class of this embodiment, the pair of crystal glass plates is transparent, semi-transparent, or tawny.

In one embodiment of the invention, the crystal grains are arranged vertically and orderly on the upper crystal glass plate in a mold, and form a crystal glass body in a hot melting furnace. When the temperature of the hot melting furnace is increased to 730° C., the surface of the crystal grains is in a molten state, and the crystal grains are partly attached to one other. Also, the crystal grains are partly attached to the upper crystal glass plate. With the decrease of the temperature of the hot melting furnace to room temperature, internal stress is eliminated. Due to a thin layer of powdery aluminum hydroxide, as a mold release agent between the pair of crystal glass plates, in the process of forming hot melt in the mold, the pair of crystal glass plates is not attached to each other, and maintains a parallel state. After the pair of crystal glass plates are cooled down and taken out from the hot melting furnace, a UV radiation curing gel is filled between them to ensure the glass plates do not break easily.

Advantages of the glass lampshade of the invention are as follows: good decorating and illuminating effect, and good safety.

DETAILED DESCRIPTION OF THE EMBODIMENTS

Figure 1:
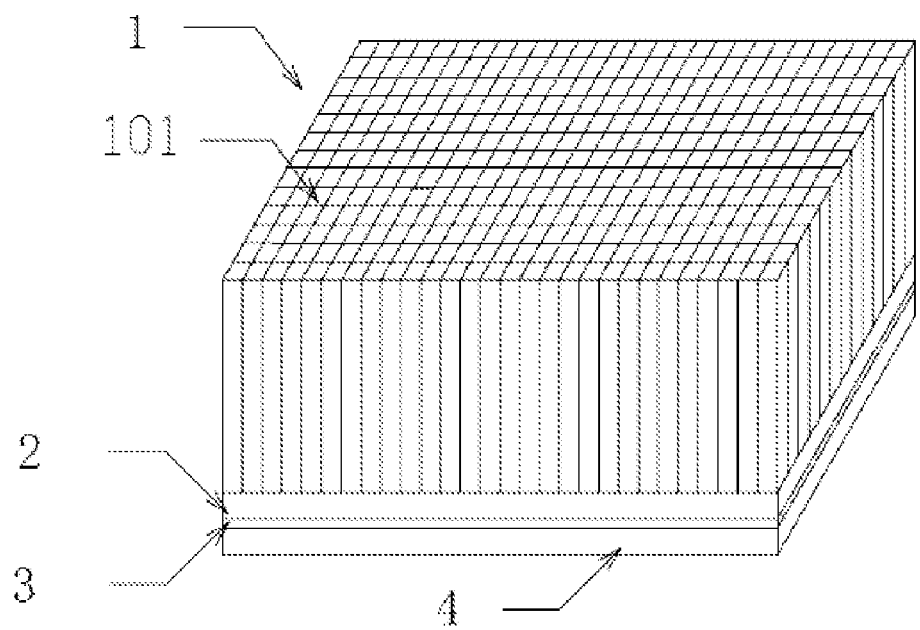
FIG. 1 is a schematic diagram of a glass lampshade according to one embodiment of the invention.

For further illustrating the invention, some embodiments are given below. It should be noted that the following are intended to describe not to limit the invention.

In one embodiment of the invention, a method for producing a glass lampshade comprises the steps of:
a) cutting a crystal glass plate with a thickness of 3 mm into crystal grains, the crystal grains being 3 mm in length, 3 mm in width, and 15 mm in height, and cleaning and drying the crystal grains;
b) putting a pair of crystal glass plates comprising an upper crystal glass plate and a lower crystal glass plate into a mold, filling powdery aluminum hydroxide with a thickness of 1.5 mm as a mold release agent between the upper crystal glass plate and the lower crystal glass plate, and arranging the crystal grains vertically and orderly on the upper crystal glass plate, the crystal grains abutting against each other and completely filling the mold;
c) putting the mold into a hot melting furnace, raising the furnace temperature to between 700 and 730° C. over a period of between 3 and 4 hours so that the contacting parts of adjacent crystal grains attach to one another, and similarly, the contacting parts of the crystal grains and crystal glass plate are attach to one another; and decreasing the temperature to room temperature over a period of between 24 and 48 hours to form a crystal grain hot-melt glass body; and
d) optionally, taking out the glass body from the hot melting furnace, cleaning out the mold release agent, injecting curing gel between the crystal glass plates, and irradiating the crystal glass plate by sunlight or ultraviolet light.

Irradiated by sunlight or ultraviolet, the pair of crystal glass plates attach to each other by means of the gel having a thickness of 1.5 mm yielding a crystal grain glass lampshade.

In this embodiment, the pair of crystal glass plates is 5 mm in thickness, 642 mm in length, and 299 mm in width. In order to fill the mold, 18000 crystal grains with dimension of 3×3×15 mm are needed.

The crystal grains are between 3 and 5 mm in length, between 3 and 5 mm in width, and between 12 and 20 mm in height.

The crystal grains of step b), which are arranged vertically and orderly on the upper crystal glass plate, may have same height and different cross section, i.e., two different dimensions of crystal grains can be used. For example, crystal grains with dimension of 5×5×15 mm, which is obtained by cutting a crystal glass plate with a thickness of 5 mm, and the above-mentioned crystal grains with dimension of 3×3×15 mm can be used in combination.

The pair of crystal glass plates is transparent, semi-transparent, or tawny, and has a thickness of between 4 and 6 mm.

In the embodiment, the mold release agent is between 1 and 2 mm in thickness, and is made of white and powdery aluminum hydroxide with fineness above 300 mesh.

The hot melting furnace of step c) is heated to a temperature of between 700 and 730° C. over a period of between 3 and 4 hours and maintained at that temperature for between 25 and 35 minutes, and then the temperature is decreased to room temperature within a period of between 24 and 48 hours.

Figure 2:
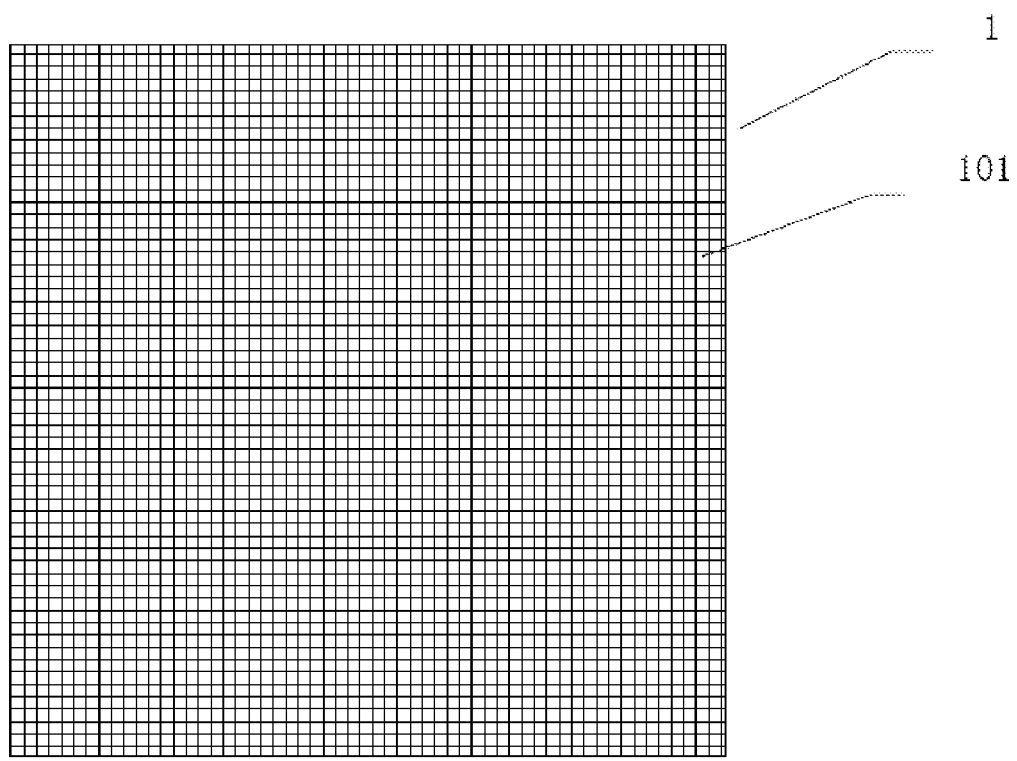
FIG. 2 is a front view of the glass lampshade shown in FIG. 1.
Figure 3:
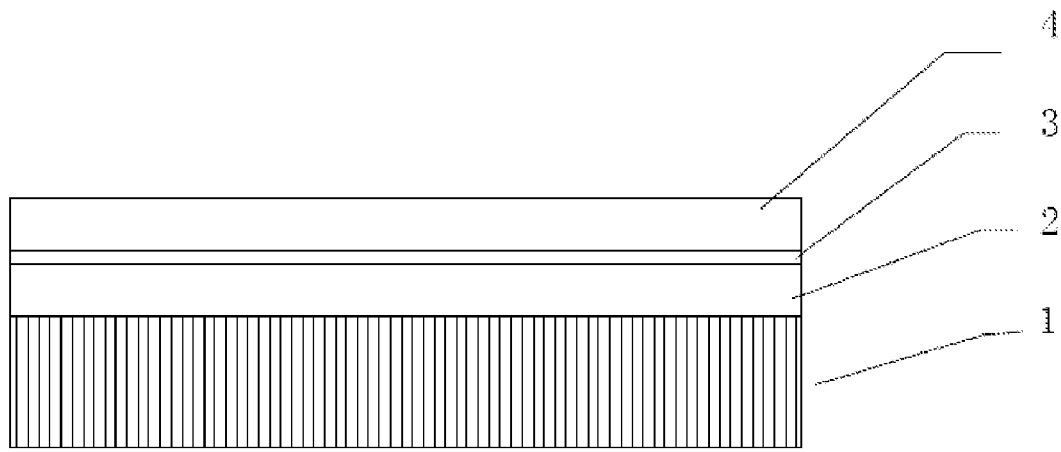
FIG. 3 is a vertical view of the glass lampshade shown in FIG. 1.

Following the above-mentioned method, a glass lampshade is produced, as shown in FIGS. 1-3. The glass lampshade comprises a fusion body of crystal grain glass 1, an upper crystal glass plate 2, a lower crystal glass plate 4, and a UV radiation curing gel layer 3, wherein the upper crystal glass plate 2 is attached to the lower crystal plate 4 by means of the UV radiation curing gel layer 3, and the fusion body of crystal grain glass 1 is attached to the upper crystal glass plate 2.

The fusion body of crystal grain glass 1 comprises a plurality of crystal grains 101. The crystal grains are arranged vertically on the upper crystal glass plate 2, the contacting parts of adjacent crystal grains become attached to each other when hot melt is formed and the contacting parts of the crystal grains and upper crystal glass plate 2 become attached to each other when hot melt is formed.

The fusion body of crystal grain glass 1 is between 12 and 20 mm in thickness. The crystal grains are between 3 and 5 mm in length, between 3 and 5 mm in width, and between 12 and 20 mm in height.

The crystal glass plates 2, 4 are transparent, semi-transparent, or tawny.

Figure 4:
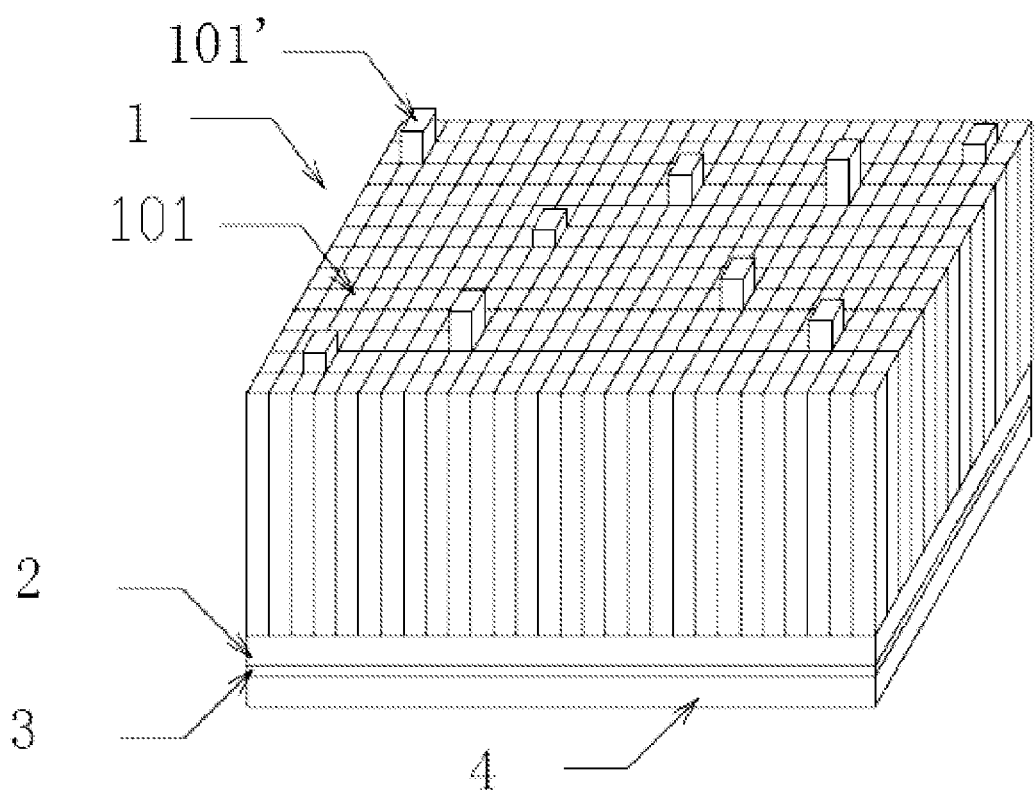
FIG. 4 is a schematic diagram of a glass lampshade according to another embodiment of the invention.

As shown in FIG. 4, another crystal glass lampshade of the invention comprises a fusion body of crystal grain glass 1, an upper crystal glass plate 2, a lower crystal glass plate 4, and a UV radiation curing gel layer 3, wherein the upper crystal glass plate 2 is attached to the lower crystal plate 4 by means of the UV radiation curing gel layer 3; and the fusion body of crystal grain glass 1 is attached to the upper crystal glass plate 2. However, the difference from the glass lampshade shown in FIGS. 1-3 is that on the top of a small number of crystal grains 101 extended are protrusions 101'. The crystal grains having protrusions 101' are distributed intervally so as to improve the overall perspective effect. The effect can be achieved by hot melting a small number of higher crystal grains with the crystal grains having a common height.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for producing a glass lampshade, comprising the steps of:
a) cutting a crystal glass plate into a plurality of crystal grains, and cleaning and drying said crystal grains;
b) putting an upper crystal glass plate and a lower crystal glass plate into a mold, filling powdery aluminum hydroxide with a thickness of between 1 and 2 mm as a mold release agent between said upper crystal glass plate and said lower crystal glass plate, and arranging said crystal grains vertically and orderly on said upper crystal glass plate, said crystal grains abutting against each other and completely filling said mold;
c) putting said mold into a hot melting furnace, and raising the temperature of the furnace to between 700 and 730° C. over a period of between 3 and 4 hours and maintaining that temperature for between 25 and 35 minutes whereby attaching contacting parts of adjacent crystal grains to one another and attaching contacting parts of said crystal grains and crystal glass plate to one another, and decreasing the temperature to room temperature over a period of between 24 and 48 hours to form a crystal grain hot-melt glass body; and
d) taking out said glass body from said hot melting furnace, cleaning out said mold release agent, injecting curing gel between said crystal glass plates, and irradiating said crystal glass plates by sunlight or ultraviolet light.

2. The method of claim 1, wherein said crystal grains are between 3 and 5 mm in length, between 3 and 5 mm in width, and between 12 and 20 mm in height.

3. The method of claim 1, wherein said crystal grains have the same height and different cross section.

4. The method of claim 1, wherein said pair of crystal glass plates is between 4 and 6 mm in thickness.

5. The method of claim 1, wherein said pair of crystal glass plates is transparent, semi-transparent, or tawny.

* * * * *